United States Patent [19]

Heatherington

[11] Patent Number: 4,549,302

[45] Date of Patent: Oct. 22, 1985

[54] MODEM WITH IMPROVED ESCAPE SEQUENCE MECHANISM TO PREVENT ESCAPE IN RESPONSE TO RANDOM OCCURRENCE OF ESCAPE CHARACTER IN TRANSMITTED DATA

[75] Inventor: Dale A. Heatherington, Decatur, Ga.

[73] Assignee: Hayes Microcomputer Products, Inc., Norcross, Ga.

[21] Appl. No.: 540,540

[22] Filed: Oct. 11, 1983

Related U.S. Application Data

[62] Division of Ser. No. 449,464, Dec. 13, 1982, Pat. No. 4,431,867, which is a division of Ser. No. 273,398, Jun. 19, 1981, abandoned.

[51] Int. Cl.$^4$ .......................................... H04M 11/08
[52] U.S. Cl. .................................. 375/8; 179/2 DP; 370/85
[58] Field of Search ................ 375/36, 8; 370/85, 94, 370/92, 95, 79; 340/825.5, 825.51; 179/2 C, 2 D

[56] References Cited

U.S. PATENT DOCUMENTS

| | | | |
|---|---|---|---|
| 3,774,164 | 11/1973 | Osterberg | 364/900 |
| 3,825,905 | 7/1974 | Allen | 364/200 |
| 3,851,105 | 11/1974 | Willard et al. | 370/85 |
| 3,916,384 | 10/1975 | Fleming | 364/200 |
| 4,009,469 | 2/1977 | Boudreau et al. | 375/36 |
| 4,121,052 | 10/1978 | Richard | 179/2 DP |
| 4,125,872 | 11/1978 | Maxwell | 364/900 |
| 4,293,948 | 10/1981 | Soderblom | 370/90 |
| 4,379,294 | 4/1983 | Sutherland et al. | 370/85 |
| 4,387,425 | 6/1983 | El-Giohary | 370/85 |
| 4,387,444 | 6/1983 | Eaton | 364/900 |
| 4,410,983 | 10/1983 | Cope | 370/85 |
| 4,429,384 | 1/1984 | Kaplinsky | 375/36 |

OTHER PUBLICATIONS

"A Mini-Computer Research Network", Lennon, Barrett, Spies, Procod. IEEE 7th Ann. Computer Conference, 1973.

"Control of Synchronous Communications Using Microcomputer Peripherals", Thomas, Proc. IEEE 15th Ann. Comp. Conf., 1977.

"Vadic Operation and Service Manual for VA831B RS232C Adaptor", Manual No. 18008-19, Issue 1, Dec. 1977.

"Intelligent Terminal Implemention for the S-100 Bus", from Doctor Dobbs' Journal of Computer Calisthenics, and Orthodontia, No. 26, pp. 4-16, 1978/1979.

Advertisment, North Star Computers (Horizon), from Personal Computing magazine, Apr., 1978.

Owner's Manual for Micromodem II, Hayes Microcomputer Product, Inc. (formerly D. C. Hayes Associates, Inc.), ©1978.

Primary Examiner—Robert L. Griffin
Assistant Examiner—Stephen Chin
Attorney, Agent, or Firm—Jones & Askew

[57] ABSTRACT

An FSK modem for coupling a standard data port (50) to a telephone line (45) in which the signal path between the phone line and the data port passes through a processor (55). When the modem is in a transparent mode of operation, for transmitting data, a timer (190) detects the passage of a predetermined period of time after the most recent data input signal input to a data port (50). If the next sequence of data signals corresponds to an escape character, the program (112) controlling the modem waits to see if a second occurrence of the predetermined period of time follows provision of the escape character. If this occurs, the modem switches to a command mode of operation in which it ceases to modulate and transmit signals and waits for commands to be entered at the data port. The same frequency detection apparatus (83, 192, 180) is used to both demodulate FSK encoded signals and detect the presence of a telephone ringing signal on the line. A pair of impedances (161, 162) provide alternate paths either through an input filtering network (167) or bypassing the network (135, 69) in a manner which allows the ring signals to pass directly to the input (69) of the frequency detector while assuring that only filtered FSK signals reach the input. Also shown is the use of the same frequency synthesizing apparatus (86, 253, 259) for generating FSK output signals and high group DTMF signals with appropriate switchable attenuation (88) provided in this signal path.

5 Claims, 7 Drawing Figures

MODEM WITH IMPROVED ESCAPE SEQUENCE MECHANISM TO PREVENT ESCAPE IN RESPONSE TO RANDOM OCCURRENCE OF ESCAPE CHARACTER IN TRANSMITTED DATA

This application is a division of Ser. No. 449,464 filed Dec. 13, 1982 entitled "Modem With Low Part Count and Improved Demodulator", now issued as U.S. Pat. No. 4,431,867; which in turn is a division of application Ser. No. 273,398 filed June 19, 1981, now abandoned.

TECHNICAL FIELD

The present invention is in the field of intelligent computer peripherals and particularly to data communications adaptors, commonly referred to as modems, adapted for angle modulated transmission and reception of data over voice grade telephone lines.

BACKGROUND OF THE INVENTION

In the late 1950s, when digital computing machines were first becoming somewhat commonplace, it occurred to those working with computers that it would be desirable to construct an arrangement whereby computers could communicate with each other and whereby operators at a remote operator location could communicate with a distant computer. While it would have been possible to construct a new communications network, it was apparent at the time that a far reaching pre-existing communications system, the telephone network, already existed. Since the telephone network was so far reaching, and already in place, the problem presented was how to allow the computers and remote devices (either other computers or terminals) to communicate over a channel designed to carry the human voice.

The solution to this problem was a device known as a data communications adapter, commonly referred to as a "modem"; modem being a contraction of "modulator-demodulator". The basic solution arrived at has become so widely used and popular that it is still the most common scheme for telephone network communication between computing devices. Basically this solution is the modulate data being transmitted through a frequency shift keyed (FSK) modulation scheme in a frequency band appropriate for transmission over voice grade telephone lines. The FSK signal is demodulated at the receiving end.

According to the most common North American standard for modems, two modes of operation are defined, called originate and answer, each mode having a pair of frequencies called mark and space defined for each mode. Thus, full duplex communication is possible wherein each of a pair of modems receives on one frequency pair and transmits on the other simultaneously.

Some more recent modems have increased the information density transmitted over voice grade telephone lines by using phase modulation schemes. However, it will be recognized by those skilled in the art that both phase modulation and frequency shift keyed modulation are all species of angle modulation and that generically angle modulation is used in most all modern modems for communication over voice grade telephone lines.

More recently, intelligent modems have been devised wherein decision making capability is built into the modem per se and the modem will perform functions in addition to the modulation and demodulation of data. For instance, modern intelligent modems will accept coded signals and provide and respond to common supervisory signals on the telephone line. For example, modern intelligent smart modems will, in response to commands; go off-hook, wait for dial tones, perform the dialing function, and answer incoming calls.

In the past, the number of components used to construct a modem tended to increase more or less linearly with the number of functions the modem performed. The provision of separate ring detection circuitry for a modem arranged to answer a telephone is an example.

Implementation of the demodulation circuitry was originally rather expensive but has, within the last decade, become less expensive due to the availability of phase lock loop integrated circuits, the phase detector output of which is commonly used to provide demodulated data at the receiving end.

Still more recently, modem functions have been fabricated on monolithic integrated circuits. However, these integrated circuits require limited input signals of a very precise 50% duty cycle to successfully demodulate incoming data. Thus, the symmetry of a squarewave derived from the incoming signal is critical and the complexity of circuitry preceding the input to the demodulator accordingly increases.

SUMMARY OF THE INVENTION

The present invention provides a full duplex intelligent modem wherein the decision making capability preferably resides in a microprocessor and which also uses many components of the modem to perform multiple functions.

Basically the present invention comprises a modem for which filter circuits are shared by the modem when performing different functions, uses the same frequency detection apparatus for demodulation of received signals as well as ring detection, uses the same frequency synthesis apparatus for transmitting modulated data and providing one group of dual tone multifrequency dialing tones and an improved arrangement for demodulating incoming data which is virtually insensitive to the duty cycle of the processed incoming signal at the input to the demodulator.

Accordingly, it is an object of the present invention to provide a modem for receiving angle modulated data signals and for performing additional telephonic supervisory functions such as answering an incoming call wherein the same signal path and frequency detection circuitry is used for detection of the ring signal on the telephone line and demodulation of incoming data.

It is a further object of the present invention to use the same frequency synthesizing apparatus for transmitting modulated data and dual tone multi frequency (DTMF) dialing signals.

It is a further object of the present invention to provide a modem with an angle modulated signal demodulator for which there is no requirement of symmetry of the duty cycle of the processed incoming signal for accurate demodulation of the data.

The present invention accomplishes this particular object by providing apparatus which is sensitive to the periods of an even number of contiguous "half cycles" of the incoming signal and which includes decision making circuitry for responding to the average period of this contiguous number of half cycles to determine the period of the incoming full cycle and thus the frequency. The present invention also provides apparatus which is responsive to the periods of an even number of pairs of half cycles or pairs of full cycles with one half or full cycle, respectively, appearing in each member of the pair.

It is a further object of the present invention to provide an intelligent modem having two operating modes wherein it will respond to commands from an attached device in one mode and will perform basic modulation and demodulation functions in a second mode.

It is a further object of the present invention to provide an inexpensive, simplified, intelligent modem which is adapted to connect to a standard voice grade telephone line to a simplified standard data port, preferably an RS-232 port.

That the present invention and the preferred embodiment thereof, overcome the drawbacks set forth above and accomplishes the objects of the invention set forth herein will become apparent from the detailed description of the preferred embodiment to follow.

DETAILED DESCRIPTION

Figure 1A:
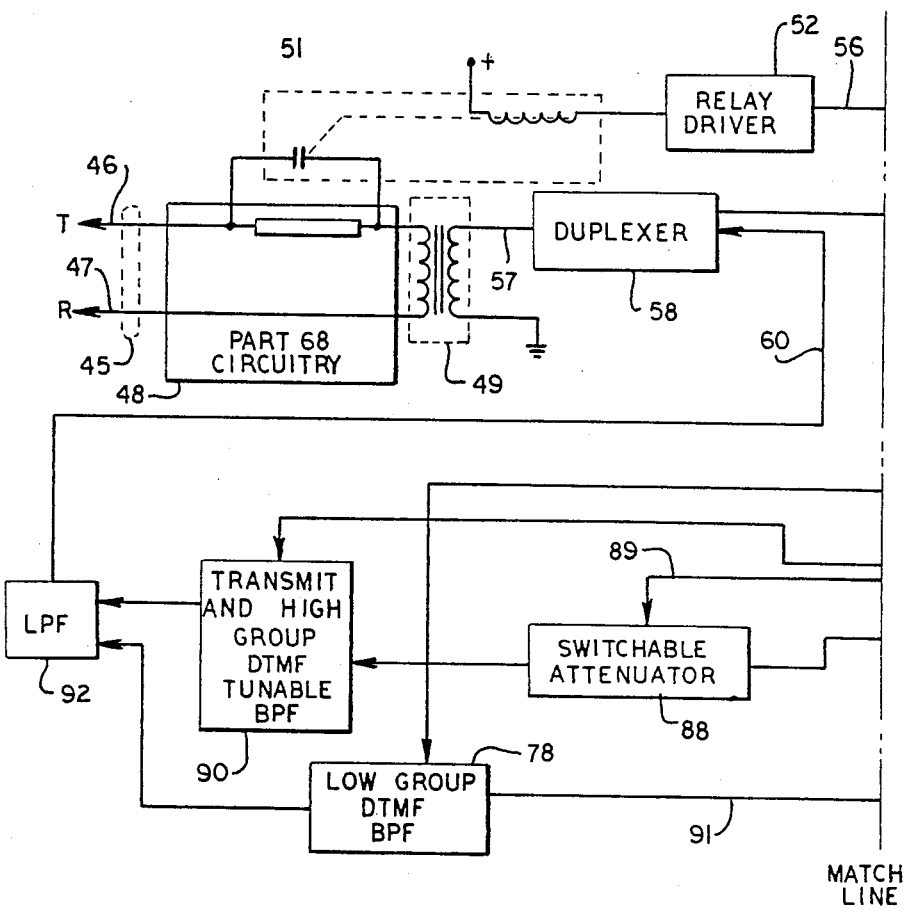
FIGS. 1A and 1B are block diagram of the preferred embodiment of the present invention.

Turning now to the drawings in which like numerals reference like components, the preferred embodiment of the present invention will now be described. FIG. 1 shows a block diagram of the preferred embodiment wherein a telephone line 45 comprising a tip conductor 46 and a ring conductor 47 is one external input to the device. The other external connection to the preferred embodiment is through an RS-232 port 50 arranged to be connected to an external device such as a Teletype machine or a computer with an RS-232 interface. It will be appreciated by those skilled in the art that RS-232 refers to a standard defining pin connections, signal levels, and the like promulgated by the Electronics Industries Association of Washington, D.C., denoted as RS-232-C (August 1969) and entitled "Interface Between Data Terminal Equipment and Data Communications Equipment Employing Serial Binary Data Interchange". Said standard is hereby incorporated by reference exactly as if set forth herein.

Telephone line 45 is connected to Part 68 registered protective circuitry 48 which will be understood by those skilled in the art to be a protective network designed according to the requirements of Part 68 of 47 CFR, the regulations of the Federal Communications Commission. This circuitry is designed to protect phone line 45 in the event of various catostrophic failures within the circuitry of the preferred embodiment. Telephone line 45 is connected to the modem through transformer 49 and relay 51 on the telephone line side of transformer 49.

Relay 51 is powered by relay driver 52 which in turn is driven by the output on line 56. The modem side of transformer 49 has one line grounded and the remaining line 57 connected to the input of a duplexer 58. Duplexer 58 is connected to incoming port at point 59 FIG. 1B and outgoing port 60. It will be appreciated by those skilled in the art that duplexer 58 performs the function of a telephone hybrid by connecting a single duplex signal path 57 to an incoming signal path 59 and an outgoing signal path 60 in a conventional arrangement which attenuates the feedback of signals from port 60 to point 59.

Following the input from point 59, the incoming signals from telephone line 45 may be monitored through line 61, amplifier 62 and speaker 65. Line 66 is used to selectively switch amplifier 62 on and off. From point 59 the input side is brought through a one hundred hertz low pass filter 67 and a tunable band pass filter 68, the outputs of which are joined at points 69 as the input to limiter 70. The output of limiter 70 is provided to an input of microprocessor 55.

Microprocessor 55 is preferably embodied by a Z-8 type microprocessor currently manufactured by Zilog Inc. of Cupertino, Calif. Of course, other microprocessors or other collections of memory, registers, counter timers and an arithmetic logic unit providing equivalent functions could be used.

Figure 1B:
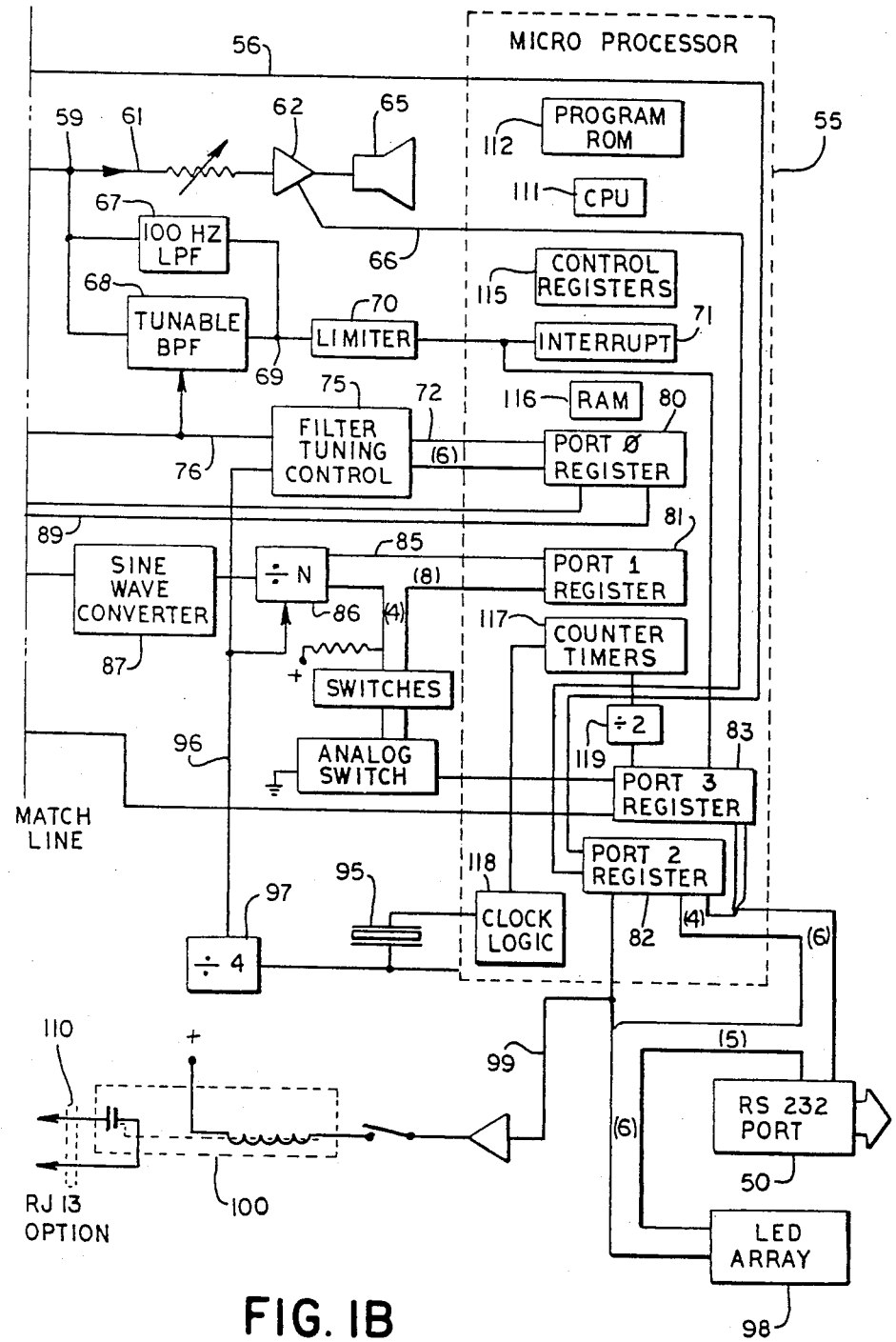

As shown in FIG. 1A, the preferred Z-8 processor includes four registers attached to four eight bit input/output ports designated as registers 80-83.

The output of limiter 70 is provided, as shown in FIG. 1, as an input to port three register 83 and also activates an interrupt control shown as 71. The operation of the apparatus of the processor 55 including interrupt block 71 will be explained in greater detail hereinbelow. A six bit bus shown as 72 comes from port zero register 80 to filter tuning control block 75. The output of filter tuning control apparatus 75 is shown as appearing on line 76 and tunes both the input band pass filter 68 and low group DTMF band pass filter 78 on the output side.

On the modulator side of the preferred embodiment, an eight bit number written into the port one register 81 appears on an eight bit output bus 85. The number on bus 85 serves as N for a divide by N counter 86.

The output of divide by N counter 86 is fed to a sine wave converter 87, the output of which is connected to a switchable attenuator 88 FIG. 1A. The attenuation level of attenuator 88 is controlled by the state of line 89.

The output of attenuator 88 is fed to a band pass filter 90 noted as transmit and high group DTMF tunable band pass filter in FIG. 1. The outputs of both of filters 78 and 90 are fed to low pass filter 92, the output of which appears on line 60 as an input to duplexer 58.

As will become apparent from the description to follow, divide by N counter 86 and sine wave converter 87 provide the frequency shift keyed modulated output of the modem and also provide the high group tones for dual tone dialing when used. During dual tone dialing, the tone for the low group appears directly on line 91 as an input to filter 78 and both tones are passed to filter 92 onto duplexer 58 and out to telephone line 45.

Other features of the preferred embodiment are also shown in FIG. 1. The main timing for the system is derived from crystal 95, which in the preferred embodiment is an eight megahertz crystal. Counter 86 and filter tuning control 75 are both controlled by a two megahertz signal which appears on line 96 as the output of divide by four circuit 97.

Also, the preferred embodiment includes an array of light-emitting diode indicators shown as 98.

One line 99 is brought out from port two register 82 to control a relay 100 for closing a contact pair 110 for use of the modem with an RJ-13 desk set connection. It will be appreciated by those skilled in the art that this is a standard arrangement providing closure across a contact pair to indicate to a plurality of visual indicators that one line of a multiline phone system is in use.

The basic structural elements of processor 55 are shown diagrammatically in FIG. 1. The interconnections by a common internal data bus and control bus are not shown for the sake of simplicity.

Processor 55 includes a central processing unit (CPU) 111 and a program read only memory 112 for storing instructions for the functions to be executed by the processor.

The Z-8 processor of the preferred embodiment includes a plurality of control registers shown as 115. A further plurality of registers accessible as random access memory are shown as 116 in FIG. 1. A pair of counter timers designated as 117 are also included in the hardware of the Z-8 processor. As will be explained in detail hereinbelow, the counter timers of the preferred embodiment are used to implement some of the novel features of the present invention.

The input from crystal 95 is provided to clock logic circuitry shown as 118 and on to counter timers 117. Included in the structure of the Z-8 is a divide by two circuit 119 which is used to provide a symmetrical output when one of the counter timers 117 is in its modulo N count state as controlled by one of control registers 115. The output of divide by two circuit (flip-flop) 119 is provided on one line of the output of the port three register 83 may be used to provide a square wave of a particular frequency. In the preferred embodiment, the particular output of the port three register appears on line 91 and is used to generate the low group tones for DTMF dialing.

The details of the internal structure of the Z-8 processor used in the preferred embodiment will be known to those skilled in the art but are described in a publications entitled "Z-8 Microcomputer, Preliminary Technical Manual", publication No. 03-3047-02, published by Zilog Inc. Said preliminary technical data manual is hereby incorporated by reference exactly as if set forth in full herein.

Thus, it will be understood from the foregoing description that the preferred embodiment shown in FIG. 1 accepts signals from data port 50 and provides a dual frequency frequency shift keyed output to telephone line 45, basically using the circuitry shown in the lower portion of FIG. 1.

Incoming signals from telephone line 45 are processed by the circuitry shown in the upper portion of FIG. 1 and provide incoming data signals to data port 50.

It should be understood that the program included in program ROM 112 of processor 55 includes instructions which are used to control the mode in which the modem of the preferred embodiment operates. In particular, two modes of operation of the preferred embodiment are defined: the command mode; and the transparent mode.

The command mode for the present invention is one in which binary data coming into RS-232 port 50 is interpreted as instructions to the modem to perform certain functions. Thus, if a computer is attached to data port 50, instructions in a predetermined code provided as input to port 50 will cause the preferred embodiment, under control of the instructions in program ROM 112, to perform certain functions such as going off-hook, dialing a particular telephone number, answering a ringing signal and so forth.

Once a predetermined instruction is provided to data port 50, the preferred embodiment will switch to the transparent mode in which all data coming into port 50 is treated as data to be modulated and sent out in coded form over telephone line 45.

It will be apparent from the foregoing that some arrangement must be made in which another command may be issued by the device attached to data port 50 to return the preferred embodiment to the command mode. In the preferred embodiment, a predetermined sequence of data bits is the escape command accepted at port 50 to return the preferred embodiment to the command mode. Since, any predetermined sequence of bits which is defined as an escape command has a finite probability of occurring in any file of data being transmitted by the preferred embodiment, an additional requirement is placed on the signal sequence which is defined as the escape sequence. The preferred embodiment of the present invention must experience one full second of no data being provided as input to data port 50, followed by the predetermined escape command, followed by a second full second of no data in order to interpret that input as the escape sequence.

Thus, even if the file being transmitted from the device attached to data port 50 out over telephone line 45 includes occurrences of the escape command string of bits, it is extremely unlikely that any random occurrence of the escape command would occur unintentionally in the environment of the entire escape sequence, that is, the escape command string surrounded by a second of no data on either side.

Figure 2A:
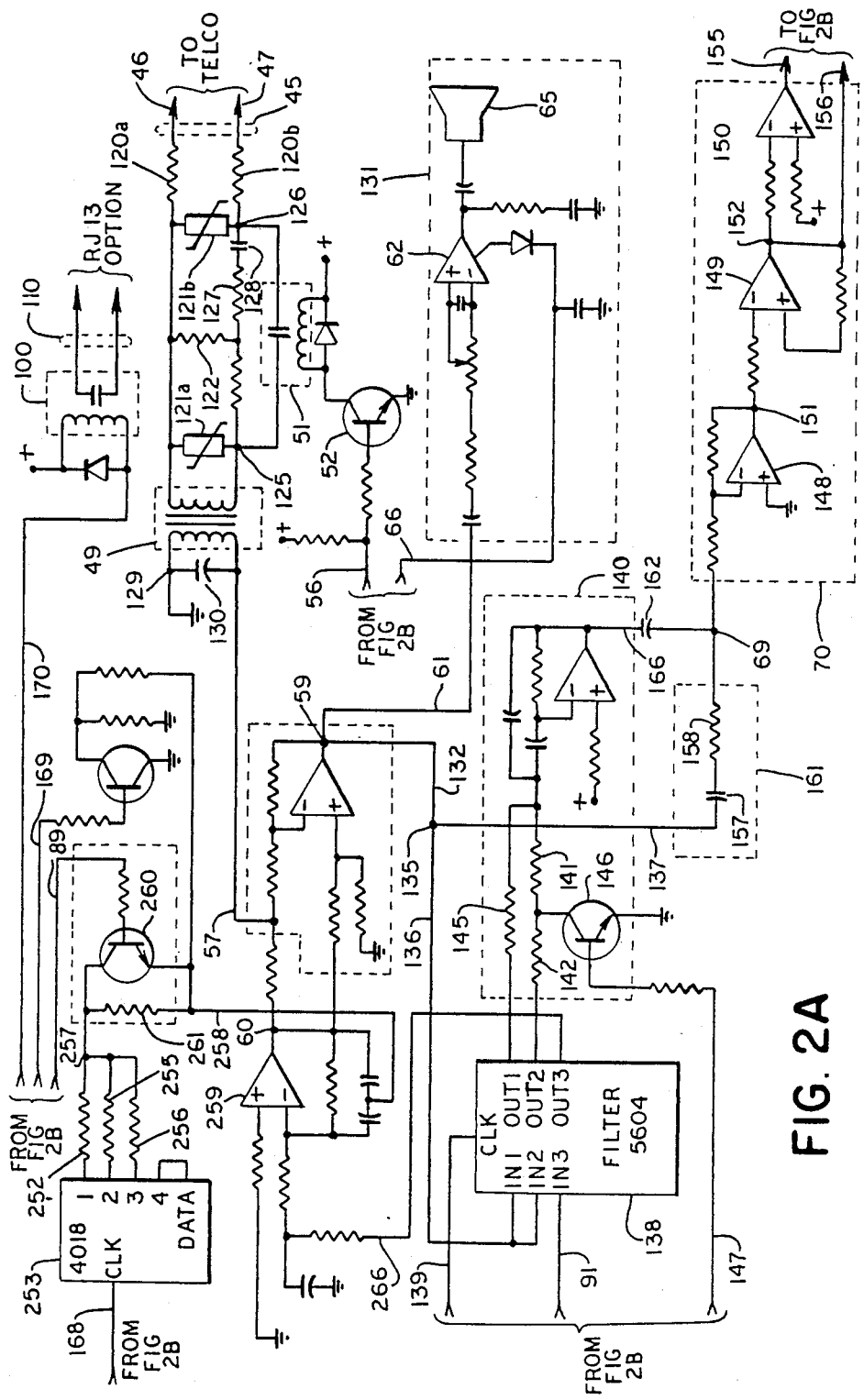
FIGS. 2A and 2B comprise a schematic diagram of the preferred embodiment with FIG. 2A showing the analog section and FIG. 2B showing the digital section of the preferred embodiment.
Figure 2B:
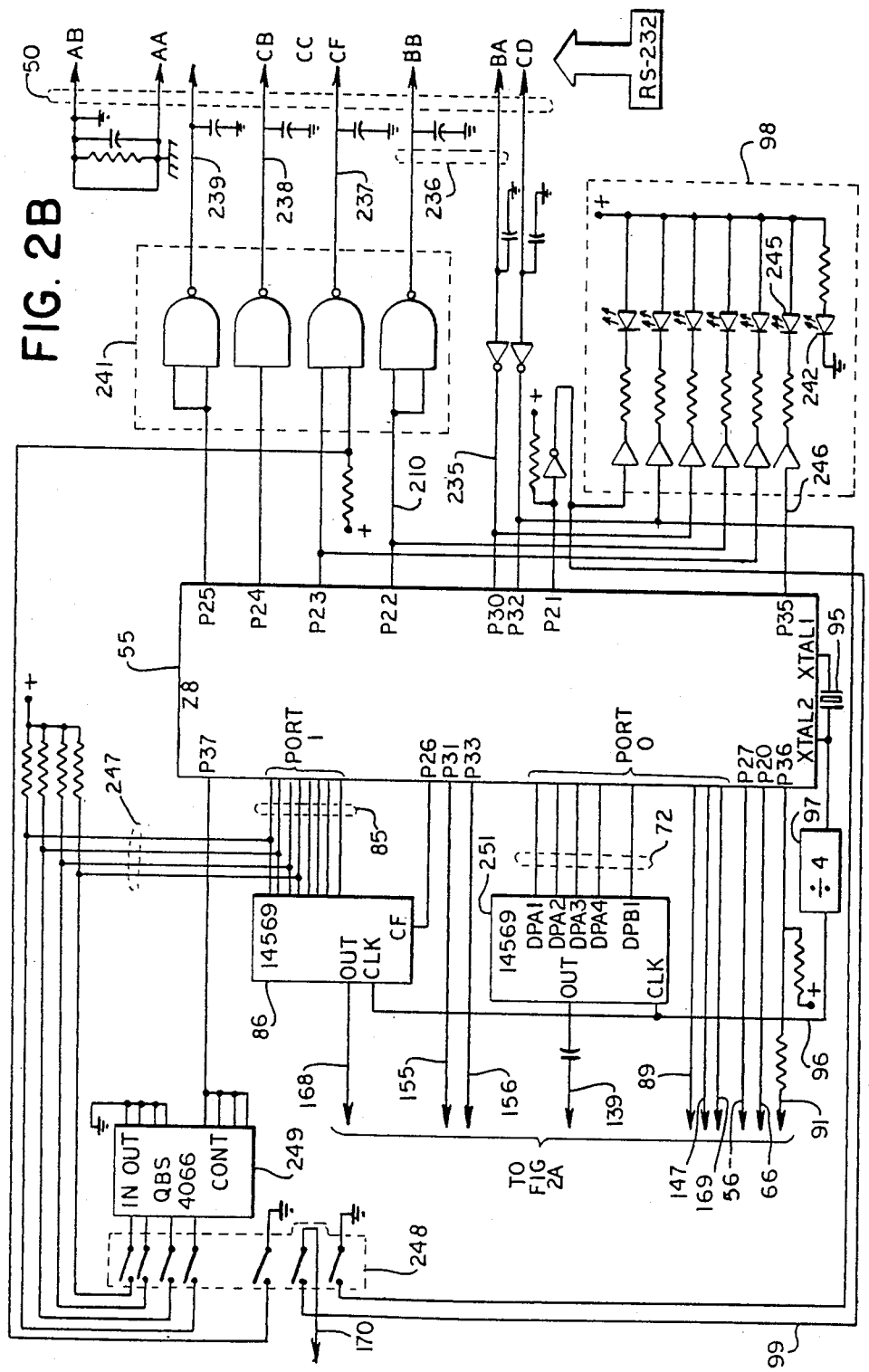

Turning now to FIGS. 2A and 2B, a detail schematic of the preferred embodiment of the present invention is shown. It should be appreciated that FIG. 2A represents the analog section of the preferred embodiment and FIG. 2B represents the digital section thereof.

Tip conductor 46 and ring conductor 47 each have a low resistance, 120a and 120b, respectively in series therewith. Telephone line 45 is shunted by a pair of transient suppressors 121a and 121b. Additionally, line 45 is shunted by resistor 122. Interposed between the contacts of relay 51, which are connected to points 125 and 126, is an RC network comprising resistor 127 and capacitor 128.

In the preferred embodiment, resistor 122 is 2.2 kilohms, resistor 127 is 20 kilohms, and capacitor 128 is 0.47 microfarads. It will thus be appreciated that resistors 127 and 122 act as a voltage divider to limit the voltage which appears across the telephone side of transformer 49 during the presence of a ringing signal on telephone line 45.

The closure of the contacts of relay 151 short points 125 and 126 together thus closing a DC loop between conductors 46 and 47 and signaling to the central office that the line is to be seized for outgoing calls or to trip the ring on incoming calls.

As may be seen from FIG. 1, transistor 52 acts as a relay driver in response to the signal present on line 56 so that when a logical one is present on line 56, transistor 52 becomes saturated allowing current to flow through the coil of relay 51 thus closing its contacts. As may be seen from FIG. 2B, line 56 is connected to bit 7 of port 2 of processor 55.

The modem side of transformer 49 has one side of the coil tied to ground at point 129 and is shunted by capacitor 130 which comprises a portion of low pass filter 92 shown in FIG. 1. Capacitor 130 is selected to filter radio frequency noise which will often be picked up by the telephone network. Th other side of capacitor 130 is connected via line 57 to the input of duplexer 58, the output of which appears at point 59. Point 59 is connected via line 61 to a monitor circuit 131 which includes amplifier 62 and speaker 65.

Amplifier 62 is turned on and off by the voltage present on line 66 and it will be understood that it may be used to selectively monitor incoming signals from telephone line 45.

Also connected to point 59 via line 132 is point 135 from which lines 136 and 137 branch. Line 136 is connected to the number one and two inputs of a switched capacitor tunable filter 138 which, in the preferred embodiment, is a type R-5604 triple one third octave six pole Chebyshev switched capacitor filter currently manufactured by EG&G Reticon of Sunnyvale, Calif. It will be understood by those skilled in the art that such filters are tunable to a center frequency proportional to the frequency of the signal present on a clock input, shown as connected to line 139 in FIG. 2A.

The number one and two outputs from filter 138 which carry the filtered output from line 136 are fed as inputs to a filter 140. As may be seen from FIG. 2A, filter 140 is arranged as a band pass filter and resistors 141, 142 and 145 are part of the frequency determining elements.

In the preferred embodiment, resistor 145 is 5.6 kilohms, resistor 141 is 1 kilohm and resistor 142 is 4.7 kilohms. Transistor 146 is responsive to the signal on line 147 to change the center frequency of filter 140 and to insert or remove the output of filter number two in the signal path. This is accomplished by either shorting the junction between resistors 141 and 142 to ground, or leaving the series combination of resistors 141 and 142 in parallel with resistor 145. Thus it will be appreciated that the center frequency of the entire filter arrangement between line 136 and point 69 through filter 140 is a function of the state of transistor 146.

Transistor 146 is switched on or off, changing the transfer function of the above described filter network according to whether the modem is operating in the originate or answer mode.

While filter 138 does the primary filtering function, filter 140 adds additional filtering and also removes the sampling noise from the output of switched capacitor filter 138. The output of the filtering arrangement at point 69 is fed into limiter 70 which comprises operational amplifiers 148, 149 and 150. The output of amplifier 148 which appears at point 151 is a signal which is proportional to a half wave rectification of the signal present at point 69. This is fed into the input of amplifier 149 which, as may be seen from inspection of FIG. 2A, has a positive feedback loop around it. Therefore, the output of amplifier 149 which appears at point 152 is a square (or rectangular) wave form which in turn is fed to inverter 150. Since point 152 is electrically identical to line 156 and line 155 carries an inverted form of the signal on 156, it will be appreciated that the signals present on lines 155 and 156 are respectively mirror images of each other and that one signal makes a positive-going transition when the other makes a negative-going transition.

Before continuing the description of the path of an incoming signal onto the apparatus of FIG. 2B, one important aspect of the present invention shown on FIG. 2A should be noted. The output of filter 140 is capacitor coupled through capacitor 162 to point 69. Also note that point 69 is connected to point 135, electrically identical to the input of filter 138, through an impedance 161 comprising capacitor 157 and resistor 158. In the preferred embodiment of the present invention, capacitor 162 is selected to be of large value, one microfarad. In the preferred embodiment, capacitor 157 is one microfared with the resistor 158 being 33 kilohms.

The frequency determining components for filter 140 are selected to provide approximately 15 dB of gain at the center of frequency of the filter. The configuration of filter 140 will be recognized by those skilled in the art as a well known band pass active filter arrangement. The switched capacitor filter 138 has approximately a zero dB insertion loss. Also, it should be understood that duplexer 58 is designed in a straightforward manner to provide approximately twenty dB of gain from line 57 to point 59.

With these parameters in mind and the abve mentioned values for capacitor 162 and impedance 161, it will be appreciated that the total transfer function between point 135 and point 69 includes the following characteristics for telephone ringing signals (on the order of 20 hertz) and incoming conventional FSK modulated signals which will be on the order of one or two kilohertz. It will be appreciated that the magnitude of impedance of 161 is relatively insensitive to the change in frequency from twenty hertz to 2 kilohertz. Impedance 161 exhibits a pole at zero and is dominated by resistor 158 at frequencies above twenty hertz. Also consider that the output impedance of filter 140 is on the order of a few ohms. In the preferred embodiment, the operational amplifier used in constructing filter 140 is a type LM-3900 currently manufactured by National Semiconductor Products, Inc.

Figure 3:
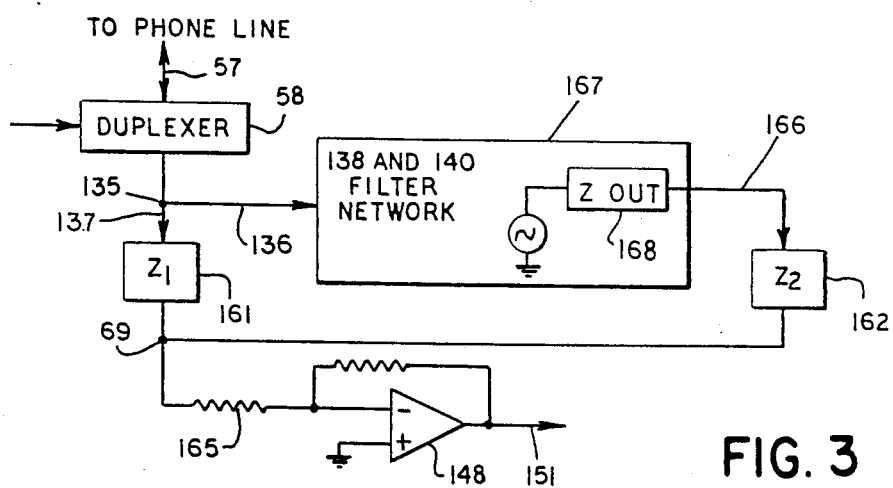
FIG. 3 is a block diagram of one aspect of the present invention showing the signal path for the telephone ringing signal and incoming modulated data.

The arrangement of the elements between points 135 and 69 has been redrawn in a simplified arrangement in FIG. 3. In FIG. 3, filters 138 and 140 are shown as one filter network block 167 with an indicated Z out block 168 which should be understood to correspond to the output impedance of filter 140. Impedance Z2 labeled 162 will be understood to correspond to capacitor 162 shown in FIG. 2A. Similarly, impedance Z1 is referenced as 161 and will be understood, in the preferred embodiment, to correspond to the series combination of capacitor 157 and resistor 158.

It should be further understood that in the preferred embodiment, resistor 165 is on the order of ten kilohms. The end of resistor 165 tied to the inverting input of operational amplifier 148 is at virtual ground since amplifier 148 is arranged with a conventional resistive negative feedback network.

Consider a telephone ringing signal of twenty hertz coming through duplexer 58 to point 135. Filter network 167 will be virtually unresponsive to signals of this frequency. From observation of FIG. 3, it will be appreciated that resistor 165 and impedance 162 (in series with output impedance 168 may be considered to be in parallel between point 69 and ground. It should further be appreciated that the aforementioned combination is connected in series with impedance 161 as a signal travels from point 69 to point 135 and thus the entire combination forms a voltage divider wherein one leg of the divider is the series combination of impedance 162 and output impedance 168 in parallel with resistor 165, and the other leg of the divider is impedance 161.

From the preferred values of components set forth above and inspection of FIGS. 2A and 3, it will be apparent that a twenty hertz ringing signal will only be attenuated by approximately twenty decibels between point 135 and point 69. Since duplexer 58 provides approximately twenty dB of gain (effectively insensitive to frequency in the range of interest), there is approximately a zero dB loss between the ringing signal present on line 57 and point 69. Thus, it will be appreciated that telephone ringing signals will pass from duplexer 58 to point 69 and thus to the input of amplifier 148 and on through limiter 70 (FIG. 2A) with approximately zero dB of attenuation.

Next consider an incoming FSK modulated signal from line 57 on the order of one or two kilohertz. Impedance 161 exhibits a magnitude approximately equal to its magnitude at twenty hertz (in the preferred embodiment approximately thirty-three kilohms). However, it will be readily appreciated that the lower leg of the above-mentioned voltage divider will be dominated by impedance 162 which has a magnitude of approximately 130 ohms at 1.2 kilohertz and approximately 80 ohms at 2 kilohertz. Thus, the division ratio of the above-noted voltage divider drops considerably so that there is a loss on the order of forty-eight to fifty decibels between point 135 and point 69 (ignoring filter network 167 per the superposition theorem) in the frequency range of the FSK signals. It will readily be appreciated that since output impedance 168 is only on the order of a few ohms that impedance 162 may be considered to effectively shunt the FSK signals as they pass from point 135 to point 69.

If one next considers the presence of filter network 167, it should be recalled that the combination provides approximately fifteen dB of gain between line 136 and line 166. Again, using the superposition theoram, it will be appreciated that the preferred embodiment of impedance 162 is a one microfarad capacitor 162 (FIG. 2A) which acts as a coupling capacitor between line 166 and point 69. Thus, the "direct" path between point 135 and point 69 for the incoming FSK signals is one which provides approximately a fifty dB loss and the "filtered" path from point 135 through line 136, filter network 167 and impedance 162 to point 69 provides approximately fifteen dB gain.

Therefore, it will be appreciated that the arrangement between point 135 and point 69 shown in the preferred embodiment provides a very simple and inexpensive arrangement for coupling both telephone ringing signals and FSK modulated signals between duplexer 58 and point 69, the input to the first stage of limiter 70 as embodied by amplifier 148. It will be appreciated that this particular arrangement allows the same frequency detecting apparatus at the output of limiter 70 (FIG. 2A) to be used to detect both the presence of FSK signals and a telephone ringing signal on line 57.

It will further be appreciated that point 135 embodies a first point in a signal path which is the input to filter network 167 and that point 69 embodies a second point in the signal path. Furthermore, impedance 161 is a first impedance connecting the first and second points and output impedance 168 is part of a means for connecting the output of filter network 167 and providing a low output impedance to a third point, line 166. Impedance 162 provides a second impedance connecting the second point and the third point. From the foregoing description it will be apparent that the first impedance 161 and the second impedance (together with output impedance 168) provide a low pass function between points 135 and point 69 and that the same combination provides a high pass or band pass function between line 166 and point 69.

Turning next to FIG. 2B, the path of an incoming signal will be traced from lines 155 and 156, the outputs of limiter 70 to the circuitry shown on FIG. 2B. As may be seen from FIG. 2B, lines 155 and 156 are brought in to pins 1 and 3 of port 3 of Z-8 processor 55. As will be known to those skilled in the art, lines 0–3 of port 3 of a Z-8 processor are available to generate interrupt request in response to negative transitions on these pins. Processor 55 is so configured in the preferred embodiment and is used to implement the novel angle modulated signal demodulator (preferably FSK) of the present invention.

It will be readily appreciated that when the modem of the preferred embodiment is operating in the answer mode, it will be responsive to the lower frequency pairs of the standard FSK frequencies and when it is in the originate mode, it will be responding to incoming higher frequency pairs. Therefore, in the originate mode, the frequency of the incoming signal, and thus the signal exiting limiter 70, will be sufficient so that only line 155 need be used to generate interrupts as will become apparent from the description of the preferred embodiment of the demodulator below. When the modem is in the answer mode it will be responding to lower frequency signals and the signals on both lines 155 and 156 will be used to generate interrupts and therefore a negative transition will be available on one of these lines to generate an interrupt on each transition (of either sense) of the input signal.

Figure 4:
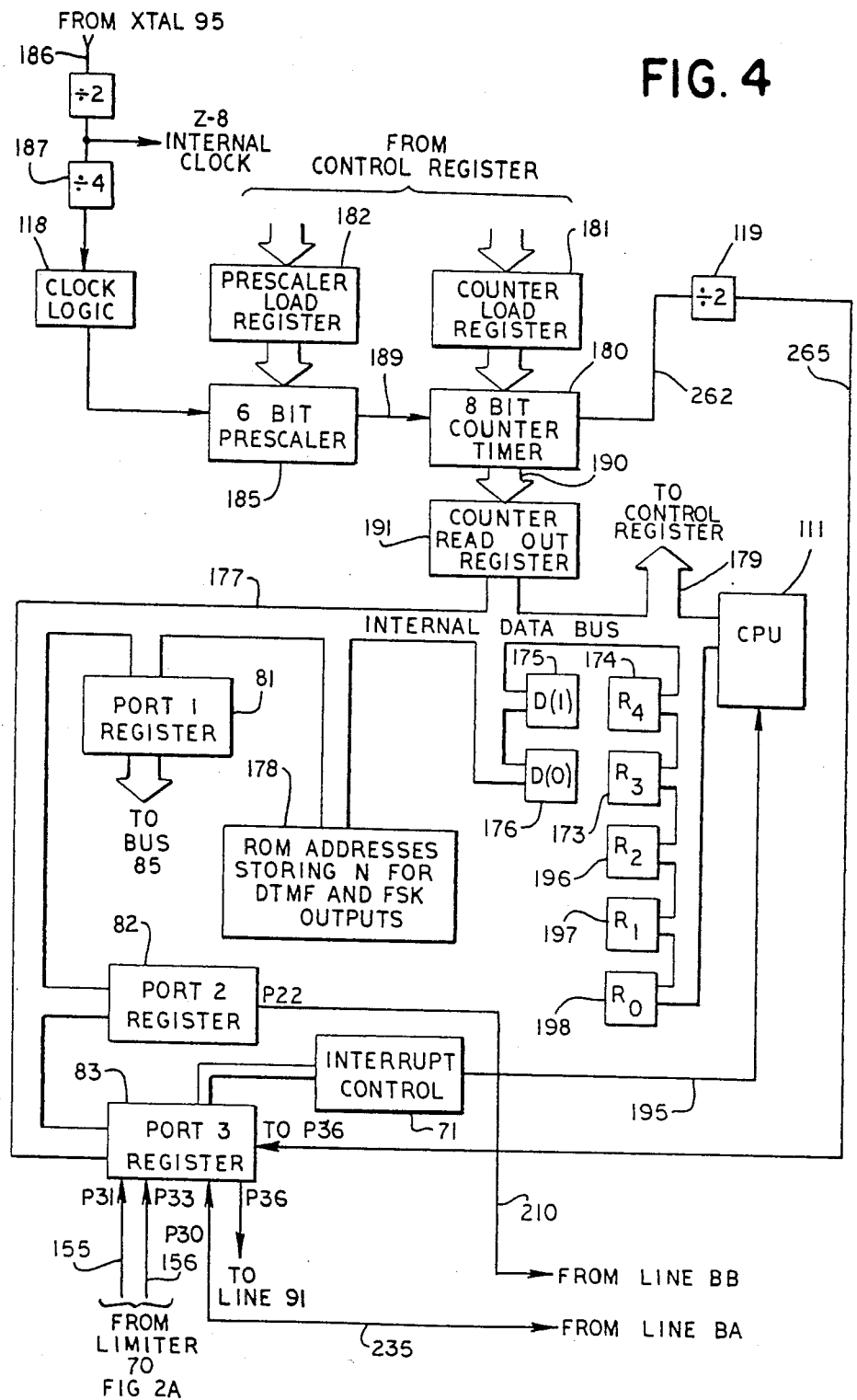
FIG. 4 is a block diagram of a portion of the demodulating and modulating circuitry of the preferred embodiment.
Figure 5:
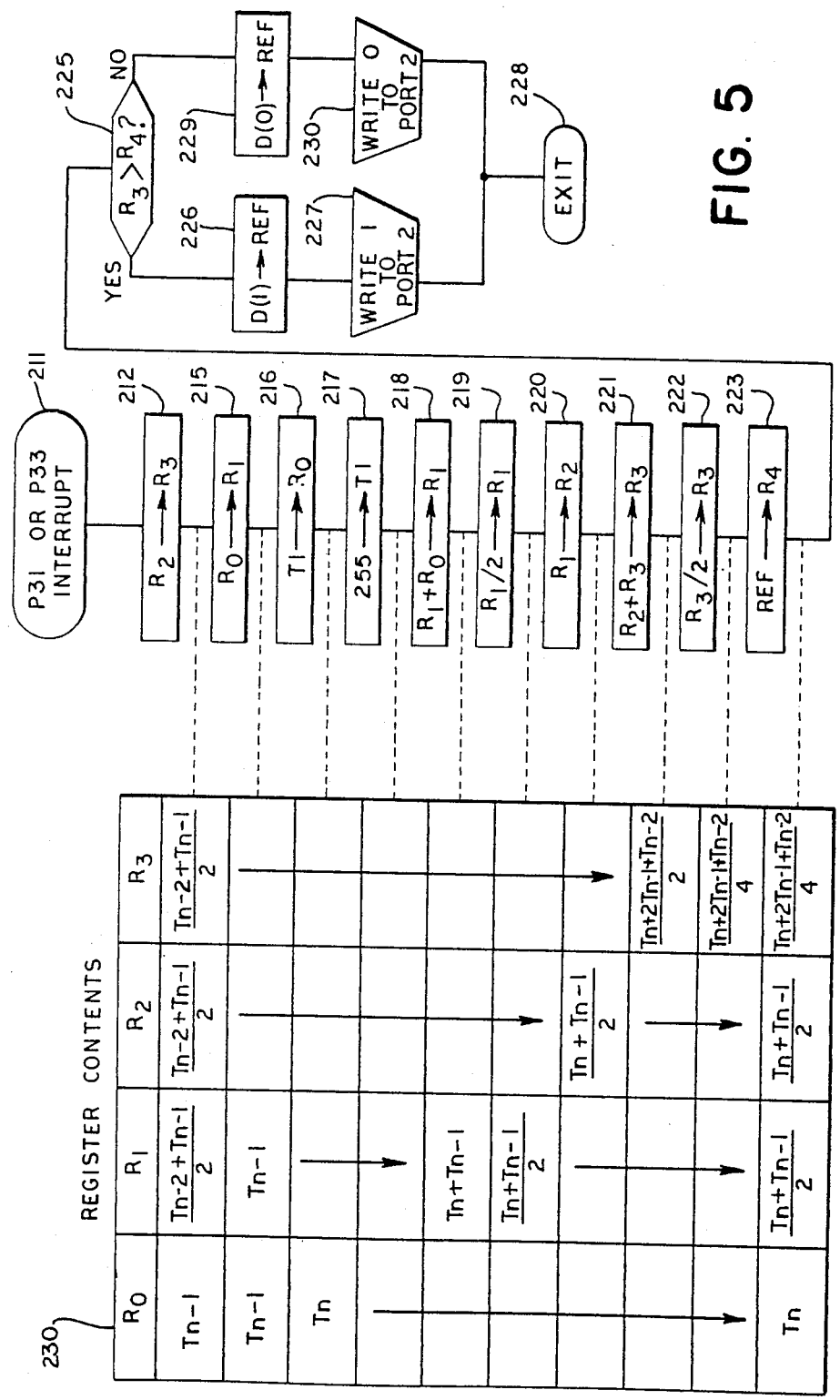
FIG. 5 is a flow diagram of the operation of the apparatus of FIG. 4 for the improved demodulator of the present invention.

The preferred embodiment of the demodulator of the present invention may be appreciated by reference to FIGS. 4 and 5. FIG. 4 illustrates a portion of the internal components of processor 55 of the preferred embodiment. Shown thereon are registers 81, 82 and 83, described hereinabove in connection with FIG. 1. Also present is a central processing unit 111 and registers $R_0$, $R_1$, $R_3$ and $R_4$, designated as 198, 197, 196, 173 and 174, respectively. It will be understood by those skilled in the art that these registers are five of the registers available as random access memory in the Z-8 processor. Also shown on FIG. 4 are two registers 175 and 176 for storing constants D(1) and D(0) which will be described in greater detail hereinbelow. It should be appreciated that registers 175 and 176 may be random access registers or addresses of read only memory 112 (FIG. 1). The internal components of processor 55 are connected by an internal data bus 177. It should be appreciated that control and address buses will also be present within processor 55 but are no shown for the sake of clarity.

Connected to data bus 177, in addition to the registers already mentioned, is a portion of read only memory designated as 178 for storing a plurality of numbers N corresponding to dual tone multi frequency signals and FSK outputs, which will be described in greater detail hereinbelow. A tap designated as 179 from data bus 177 is noted as going to control registers (not shown) which will be understood by those skilled in the art to control the loading of counter load register 181 and prescaler load register 182.

Also shown on FIG. 4 is an input designated 186 from crystal 95 (FIG. 1, FIG. 2B) which internally is divided by two and, again divided by four at block 187 before reaching clock logic 118 connecting the signal to prescaler 185.

Since, in the preferred embodiment, crystal 95 is an eight megahertz crystal, it will be appreciated that a one megahertz signal will be present on line 188 as the input to prescaler 185.

Consider for a moment that the modem of the preferred embodiment is in the originate mode and is thus conditioned to respond only to transitions on line 155 corresponding to transitions in the higher frequency pair of conventional FSK signals.

In the preferred embodiment, prescaler load register 182 is loaded with a number which, when appropriate command is received, will load a number into six bit prescaler 185 corresponding to divide by four. Thus, the output signal on line 189 as an input to counter timer 180 will be 250 kilohertz. As will be known to those skilled in the art, the counter timers such as counter timer 180 of the Z-8 processor are eight bit down counters having parallel outputs on bus 190 which are loaded into counter read out register 191. Register 191 is connected to data bus 177. The instructions in read only memory 112 (FIG. 1) cause the following sequence of events to take place. Consider that counter 158 has been loaded to its maximum value (255) and has been counting down in response to the 250 kilohertz signal on line 189. At some point the input signal on line 155 makes a negative-going transition which appears at pin 31 of port 3 register 83 and causes interrupt control 192 to generate an interrupt request on line 195 to CPU 171.

As will be known by those skilled in the art, the interrupts of the Z-8 processor are vectored and thus control is transferred to a routine from program ROM 112 (FIG. 1) which begins the following sequence. The contents of counter 180 are read out along bus 190 into counter read out register 191. The number 255 which will be in the counter load register 181 will be loaded into counter 180 and down counting of pulses on line 189 will recommence. CPU 171 will transfer data among registers 173 and 196-198 as well as registers 175 and 76 according to the routine shown in FIG. 5. According to the routine shown in FIG. 5, a decision is made as to whether a binary one or a binary zero should be written out onto pin 2 of port 2 from register 82 which will appear on line 210.

Turning now to FIG. 5, the routine executed will be described. On the right hand side of FIG. 5 is a flow chart showing the arithmetic operations and the transfer among the noted registers executed by the program ROM. On the left hand side of FIG. 5, block 230 is an indication of the register contents after execution of each step.

It should be kept in mind that the demodulator of the present invention in its simplest form is responsive to an even number of contiguous half cycles to determine the frequency of the incoming signal.

When the preferred embodiment is operating in the answer mode, it is responsive to transitions of the signal input to limiter 70 of both positive and negative going. When it is operating in the originate mode, it is responsive to transitions of only one sense. Therefore, in the first case it is responsive to even numbers of half cycles and in the second it is actually responding to an even number of cycles which will be understood to also be responsive to an even number of half cycles since each cycle is comprised of two half cycles.

It has been found to be preferable to render the improved demodulator of the present invention responsive to an even number of half cycles or full cycles with the average being weighted in favor of the half or full cycles in the middle of the sequence selected. This preferred form is shown on FIGS. 4 and 5. Thus, as may be seen from FIG. 5, the preferred embodiment is responsive to an even number of pairs of half or full cycles. However, the half or full cycles pairs have a common member. Thus in the preferred embodiment (using full cycles as an example) the pairs are; nth and (n−1)th, and (n−1)th and (n−2)th. Therefore in the language of this specification, contiguous or successive pairs of cycles or half cycles shall be understood to be the pairs taken two cycles at a time while stepping one cycle in the sequence between defined pairs. Thus for cycles (or half cycles) i, j, k, l . . . contiguous pairs are (i,j), (j,k), (k,l) . . . .

To understand the register contents portion of FIG. 5, it should be understood that a continuous set of half cycles having periods $T_{n-2}$, $T_{n-1}$, $T_n$ have occurred on line 155. It is assumed that the interrupt noted at step 211 on FIG. 5 occurs at the end of half cycle $T_n$. With this in mind, it will be appreciated that the register contents are as shown in FIG. 5. At step 212 the contents of R2 are transferred to R3 (register 196 to register 173 in FIG. 4). At step 215, the contents of R0 is transferred to R1 and at the following step 216 the contents from counter read out register 191 (FIG. 4) denoted as T1 are transferred to register R0. At step 217, the counter is reloaded with 255 as described hereinabove and downcounting proceeds.

At the next step 218, the sum of the contents of R1 and R0 are loaded into register R1 and at step 219 one half of this sum is computed and loaded into R1. As may be seen from register contents block 230 after this step has been completed, the average of the last two cycles is stored in R1. At step 220, this quantity is transferred to register R2 and at step 221 the quantity is added to the previous contents of register R3 and the sum is stored therein. As may be seen from block 230, R3 now contains one half of the sum shown in block 230 which is the number representing the present nth period, twice the (n−1)th period plus the (n−2)th period. At step 222 this figure is divided by two and stored in R3 and thus the contents of R3 is the average of the last two periods or last two pairs of periods as represented by the numbers counted in counter 180 between successive negative-going transitions on line 155.

At step 223 a quantity referred to as REF is loaded into register R4 and then a decisional step shown at 225 is executed. In considering step 225, it should be apparent that counter 180 is always loaded with its maximum count value (255) and counts down between the time it is loaded and the time the next negative-going transition occurs on line 155. This being the case, it follows that the greater the number in counter 180 at the time step 216 is executed, the higher the frequency present on line 155. Thus, the greater the contents of register R3 at the end of step 222, the higher the frequency to which it was responsive, that on line 155, will be. Therefore if the YES branch is taken from decisional step 225, a quantity noted as D1 which is shown as stored in register 175 on FIG. 4 is loaded into the register containing REF. The significance of this will be explained in a moment. Once this has occurred at step 227, a binary one is written to port 2 which, from FIG. 4 can be seen to appear on line 210 to the BB pin of the RS-232 interface. It will be recognized by those skilled in the art that the BB pin is defined as the received data pin under this standard.

If the NO branch is taken from decisional step 225 the quantity DU is loaded into REF at step 229 and a zero is written out on line 210 at step 230. Step 228 represents an exit from this routine until the occurrence of the next interrupt in response to a negative-going transition on line 155.

It may be seen from inspection of steps 222-225 on FIG. 5 that either D(0) or D(1) is the reference figure to which the quantity register 3 is compared in order to decide whether an FSK signal representing a one or a zero is present on line 155. From inspection of steps 226 and 229, it will be apparent that a different reference quantity is loaded into the register REF depending on the present state of the output on line 210. It will be apparent upon the occurrence of the next interrupt which reenters the program shown on FIG. 5 at step 211, reference will contain a quantity which is dependent upon the present state of line 210. Thus it may be seen that the selection of a different value to be placed in the REF register depending upon the present state of the output on line 210 provides a hysteresis to the decision making apparatus which distinguishes ones and zeros on the FSK input on line 155. In the preferred embodiment, D(0) and D(1) differ by a value of one but it will be appreciated that depending upon the frequency range of the input angle modulated signal, the scale of prescaler 185, different values for D(0) and D(1) to provide the appropriate historesis may be selected as a matter of choice.

Turning now to FIG. 2B, it will be appreciated that the above described output of one or zero in response to an incoming demodulated FSK signal is written out onto line 210. Incoming binary data appears from BA input of RS-232 port 50 and appears in its inverted form on line 235 to the P30 input of processor 55. It will therefore be appreciated that pair 236 comprises a data link. As is set forth in the above-referenced RS-232 standard, circuit BA (line 235) is the transmitted data circuit and circuit BB (line 210) is the received data circuit.

The other pins from RS-232 port 50 which appear on lines 237-239 are labeled as defined in the standard. It should be appreciated that these lines are connected to port 2 of processor 55 through conventional line drivers shown as 241.

Light-emitting diode array 98 may be seen to provide a plurality of light-emitting diodes indicating the status of port 50. In addition to the LEDs of array 98 for indicating the port status, LED 242 serves to indicate when the modem is on and LED 245 which is connected to pin 5 of port 3 of processor 55 by line 246 is activated when modem is placed in its automatic answer mode for automatically answering an incoming call on telephone line 45 (FIG. 2A).

Thus it will be appreciated that in the preferred form of the present invention, all data passing between port 50 and telephone line 45 goes through processor 55.

Also shown on FIG. 2B is a four bit tap 247 from bus 85 which carries the output of port one of processor 55. This tap is connected through four switches of switch array 248 to the inputs of a quad bilateral switch 249, the outputs of which are grounded and the control inputs of which are controlled by line 250 from pin 37 of the Z-8 processor. Quad bilateral switch 249 is preferably embodied by a type 4066 CMOS quad bilateral switch currently manufactured by RCA. It will thus be appreciated that under the control of line 250 the states of the four switches from array 248 connected to tap 247 may be read under control of the program of the Z-8 processor. Switches 248 are included to provide certain switchable options in the preferred embodiment and periodically processor 55 will read the states of these switches to ascertain what options, to be implemented under software control, have been selected by the user.

Consider next the path of a data signal from line 235 into processor 55 as a binary one or zero out to its FSK modulated form to telephone line 145.

Incoming data on line 235 is provided to pin zero of port 3 as may be seen in FIGS. 2B and 4. The status of pin 30 is periodically read by CPU 111 (FIG. 4) and, depending upon the mode (originate or answer) in which the modem is operating and whether a one or zero is present on line 235, an appropriate number N is selected from ROM addresses 178 and written into port one register 81.

Also, an appropriate number is selected to be written out onto six bit bus 72 from port zero to the divide control inputs of counter 251.

Counters 86 and 251 in the preferred embodiment are type 14569 CMOS divide by N counters currently manufactured by RCA. These counters divide the clock signal present on line 96 and provides outputs on lines 168 and 139, respectively, which is the quotion of the frequency on line 96 divided by a number determined by the states of the input buses. Since line 96 carries the output of crystal 95 divided by four, it will be apparent that a two megahertz signal is present on line 96.

The output on line 139 from counter 251 is provided as the clock input to switched capacitor filter 138 FIG. (2A). As noted hereinabove, this signal is selected to be on the order of one hundred times the center frequency of the filter. The output on line 168 is selected to be eight times the output frequency desired.

Turning now to FIG. 2A, it may be seen that line 168 carrying eight times the frequency to be transmitted is provided as a clock input to a type 4018 CMOS Johnson counter currently manufactured by RCA having its "1", "2" and "3" outputs tied to weighting resistors 252, 255 and 256. In the preferred embodiment, resistors 255 and 256 are selected to be equal and resistor 252 is approximately 1.5 times the value of the other two resistors. These resistors are connected to a summing point at 257. As will be appreciated by those skilled in the art, such an arrangement of a Johnson counter provides an output approximating a sine wave at point 257 of ⅛th the frequency present at the clock input on line 168.

The output from point 257 is connected through attenuator 88 to the input of a band pass filter built around operational amplifier 259. While drawn differently in FIG. 2A, it will be appreciated that the band pass filter provided by amplifier 259 is arranged in the same manner as band pass filter 140. This filter smooths out the higher frequency components from the approximate sine wave present on line 258 and provides an output at point 60 corresponding to the FSK output desired according to the state of line 235. This signal is provided to line 57 through duplexer 58 and coupled through transformer 49 out to telephone line 45.

Thus, it will be appreciated that the appropriate number N written out on bus 85 from port one (FIG. 2B)

controls the frequency of the output of Johnson counter 253, which in turn provides the FSK output signal.

Another novel feature of the present invention is the use of the same frequency synthesizing circuitry described immediately above to produce one group of frequencies for dual tone multi frequency dialing signals. The modem of the preferred embodiment may be commanded to call a particular telephone number when it is in the command mode. Depending upon the particular signal brought in on line 235 from the device connected to port 50, either dial pulse output or dual tone multi frequency dialing signals will be provided.

When a command is received to provide dial pulses, the dial pulses are synthesized on line 56 from pin 7 of port 2 and relay 51 is operated to provide dial pulses of appropriate frequency and duty cycle to dial the number. When dual tone multi frequency dialing is desired, a number selected from ROM storage 178 (FIG. 4) is provided onto bus 85 to cause Johnson counter 253 to provide one frequency from the high group of standard dual tones. Also, when dual tone dialing is occurring, line 89 from port zero of processor 55 goes high turning on transistor 260 of attenuator 88 shorting out resistor 261. This raises the level of the signal present on line 258 and thus provides a stronger signal to telephone line 45 since the dual tone signals for dialing must be about six dB higher than the FSK data signals output to the telephone line.

The low group tones for the dual tone dialing signals are directly synthesized at pin P36 of processor 55 and appear on line 191.

Turning for a moment to FIG. 4, a description of the apparatus for generating the low group tones will be described. Since there is no incoming data to be demodulated when the modem is in the command mode and dialing a particular number, it is preferred to use the same apparatus used in the above-described demodulator to generate the low group tones for dual tone dialing. When a particular digit to be dialed is received by CPU 171 through the signals (which must be deserialized) from line 235 from the device connected to port 50; the control register (not shown) provides two bits indicating that counter 180 should be in its modulo N state and thus will continually count through the same sequence. As will be appreciated by those skilled in the art, the sequence will be determined by the number present in counter load register 181 and prescaler 185. Each time counter 180 counts down to zero, a pulse appears on line 262 which serves as a carry output from counter 180. Each occurrence on pulse on line 262 toggles flip-flop 119 which serves as a divide by two and thus a symmetric square wave output appears on line 265 which is provided to pin 6 of port 3 at port 3 register 83 and ultimately appears on line 91. Therefore the arrangement for using the same apparatus to produce the low group dual tones for dual tone dialing and for the demodulator when the modem is operating in its transparent mode further meets the above stated object of the invention to maximize the sharing of components to implement different functions.

The square wave output on line 91 is provided to input 3 of switched capacitor filter 138. When dual tone dialing is taking place, the number from port zero on six bit bus 72 will select an appropriate frequency on line 139 to change the center frequency of filter 138 to smooth out the square wave on line 91 to provide the appropriate low group tone on line 266 as an input to the filter at amplifier 259.

Thus when dual tone dialing occurs, switched capacitor filter 138 is not needed for detection of incoming signals and may be devoted to filtering the low group signal from line 91. The high group tone on line 258 is mixed with the low group tone from line 266 and thus the two tones for the particular digit being dialed appear on line 57 and are coupled out to telephone line 45.

Table 1 below shows digits N which are written onto bus 85 to generate the mark and space tones for both originate and answer modes and the column signals C1-C3 for the high group DTMF tones. The first two columns of the table indicate the type of signal and the defined desired frequency, the second two columns show the value of N as a decimal number and a hexadecimal number and the right hand column of the table shows the actual frequency output which appears at point 257 (FIG. 2A). It will be apparent from the foregoing description that digits N will be the rounded off integer result of dividing two megahertz by eight times the desired frequency.

TABLE 1

| SIGNAL | FREQ. | N | Nhex | ACT. FREQ. |
|---|---|---|---|---|
| Space (Org) | 1070 | 234 | EA | 1068.38 |
| Mark (Org) | 1270 | 197 | C5 | 1269.04 |
| Space (Answ) | 2025 | 124 | 7C | 2016.13 |
| Mark (Answ) | 2225 | 112 | 70 | 2232.14 |
| C1 | 1209 | 207 | CF | 1207.73 |
| C2 | 1336 | 187 | BB | 1336.90 |
| C3 | 1477 | 169 | A9 | 1479.29 |

From the foregoing it will be apparent that the apparatus for generating both the FSK output signals and the high group DTMF signals includes a first register, register 83, for storing data signals received from data port 50. The apparatus also includes a second register means, port one register 81, for providing a frequency signal corresponding to one of the signals N shown in Table 1.

Counters 86 and 253 provide signal generating means which are connected to register 81 for providing an output signal on line 258 having a frequency proportional to the frequency signal present on bus 85.

Processor 55 comprises a control signal which is responsive to first and second predetermined strings of data signals coming in on line 235 for providing first and second modes of operation, one being the command mode in which dialing takes place and the other being the transparent mode described hereinabove wherein modulation takes place one bit at a time in response to the signals line 230.

The control means will be understood to be responsive to the signal in register 83 to provide the appropriate values shown in Table 1 for the column signals or high tones for dual tone dialing when the modem is in its command mode of operation and alternately is responsive to the data signals at register 83 to provide values of N to register 81 corresponding to one of the mark or space signals shown in Table 1 when the modem is in its transparent mode of operation.

It will further be understood that attenuator 88 provides an attenuation means between the above noted signal generating means and telephone line 45 which attenuates the output signal from point 257 when the modem is in its transparent mode of operation.

From the foregoing description it will be appreciated that the preferred embodiment of the present invention achieves the objects of the invention set forth hereinabove and provides a less expensive reliable modem in which many parts are used to implement more than one function and which provides the novel features recited hereinabove. It will therefore be understood that the scope of the present invention is to be limited only by the claims below.

I claim:

1. In a modem including a data input port for connecting said modem to a utilization device, and a telephone port for connecting said modem to a telephone line; said modem being of the type having two distinct modes of operation:
   (a) a transparent mode of operation for which said modem provides modulated signals to said telephone port in response to data signals provided to said data input port; and
   (b) a command mode of operation for which said modem responds to said data signals provided to said data input port as instructions to said modem;
   said modem including means defining a predetermined sequence of said data signals as an escape character; the improvement comprising:
   timing means for detecting each occurrence of a passage of a predetermined period of time after provision of one of said data signals to said data input port; and
   means, operative when said modem is in said transparent mode of operation, for detecting provision of said predetermined sequence of said data signals, and for causing said modem to switch to said command mode of operation, if and only if said predetermined sequence of data signals occurs contiguous in time with at least one said occurrence of said passage of said predetermined period of time during which none of said data signals are provided to said data input port.

2. In a modem including a data input port for connecting said modem to a utilization device, and a telephone port for connecting said modem to a telephone line; said modem being of the type having two distinct modes of operation:
   (a) a transparent mode of operation for which said modem provides modulated signals to said telephone port in response to data signals provided to said data input port; and
   (b) a command mode of operation for which said modem responds to said data signals provided to said data input port as instructions to said modem;
   said modem including means defining a predetermined sequence of said data signals as an escape character; the improvement comprising:
   timing means for detecting each occurrence of a passage of a first predetermined period of time after provision of one of said data signals to said data input port, and for detecting each occurrence of a passage of a second predetermined period of time after a provision of said predetermined sequence of data signals defined as said escape character; and
   means, responsive to said timing means, and operative while said modem is in said transparent mode of operation, for causing said modem to switch to said command mode of operation in response to each occurrence of said escape character being provided to said data port, if and only if said escape character is preceded by said passage of said first predetermined period of time and followed by said passage of said second predetermined period of time during which none of said data signals are provided to said data input port.

3. A modem as recited in claim 2 wherein:
   said first predetermined period of time and said second predetermined period of time are equal.

4. In a modem including a data input port for connecting said modem to a utilization device, and a telephone port for connecting said modem to a telephone line; said modem being of the type having two distinct modes of operation:
   (a) a transparent mode of operation for which said modem provides modulated signals to said telephone port in response to data signals provided to said data input port; and
   (b) a command mode of operation for which said modem responds to said data signals provided to said data input port as instructions to said modem;
   said modem including means defining a predetermined sequence of said data signals as an escape character; the improvement comprising:
   timing means for detecting each occurrence of a passage of a predetermined period of time after provision of one of said data signals to said data input port; and
   means, operative when said modem is in said transparent mode of operation, for detecting provision of said predetermined sequence of said data signals contiguous in time with at least one said occurrence of said passage of said predetermined period of time, and for causing said modem to switch to said command mode of operation in response thereto, and alternately for causing said modem to remain in said transparent mode of operation and to provide a sequence of said modulated signals to said telephone port, corresponding to said predetermined sequence of said data signals, in response to said detection of said predetermined sequence of said data signals both preceded and followed, in time, by at least one of said data signal occurring within a time period less than said predetermined period of time.

5. In a modem including a data input port for connecting said modem to a utilization device, and a telephone port for connecting said modem to a telephone line; said modem being of the type having two distinct modes of operation:
   (a) a transparent mode of operation for which said modem provides modulated signals to said telephone port in response to data signals provided to said data input port; and
   (b) a command mode of operation for which said modem responds to said data signals provided to said data input port as instructions to said modem;
   said modem including means defining a predetermined sequence of said data signals as an escape character; the improvement comprising:
   timing means for detecting each occurrence of a passage of a predetermined period of time after provision of one of said data signals to said data input port; and
   means, operative when said modem is in said transparent mode of operation, for detecting provision of said predetermined sequence of said data signals, and for causing said modem to switch to said command mode of operation, if and only if said modem detects an occurrence of a specific condition of said predetermined sequence occurring contiguous in time with at least one said occurrence of said passage of said predetermined period of time during which none of said data signals are provided to said data input port, and in the absence of said occurrence of said specific condition, to respond to said provision of said predetermined sequence of data signals to said data input port to provide a sequence of modulated signals to said telephone port, corresponding to said predetermined sequence of data signals, and causing said modem to remain in said transparent mode of operation.

* * * * *